(12) United States Patent
Baggenstoss

(10) Patent No.: US 8,407,020 B1
(45) Date of Patent: Mar. 26, 2013

(54) FAST METHOD TO SEARCH FOR LINEAR FREQUENCY-MODULATED SIGNALS

(75) Inventor: Paul M. Baggenstoss, Bonn (DE)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 302 days.

(21) Appl. No.: 12/891,918

(22) Filed: Sep. 28, 2010

(51) Int. Cl.
  *G06F 17/14* (2006.01)
(52) U.S. Cl. ............................................. 702/75
(58) Field of Classification Search .......... 702/75, 702/74; 375/132, 139, 340
  See application file for complete search history.

(56) References Cited

U.S. PATENT DOCUMENTS

| | | | | |
|---|---|---|---|---|
| 5,418,818 A * | 5/1995 | Marchetto et al. | ............ | 375/264 |
| 6,484,112 B1 * | 11/2002 | Scheppach | .................... | 702/77 |
| 6,598,005 B1 * | 7/2003 | Hillerstrom | .................... | 702/75 |
| 7,076,380 B2 * | 7/2006 | Michel | ............................ | 702/75 |
| 7,124,042 B2 * | 10/2006 | Rao | ................................ | 702/76 |

* cited by examiner

*Primary Examiner* — Bryan Bui
(74) *Attorney, Agent, or Firm* — James M. Kasishcke; Michael P. Stanley; Jean-Paul A. Nasser

(57) ABSTRACT

A computer implemented method for determining frequency and slope of a linear frequency modulated signal. Windowed signal data is collected and used for formulating a search surface function which can be calculated recursively. The function is divided into parts. Part values are calculated at an underspecified number of points corresponding to the number of parts. The search surface function part values are interpolated at values between frequency values. An interpolation geometry is chosen and then the function part values are interpolated at values between frequency values and slopes. Function parts are added together giving a restored search surface function. The frequency and slope values can be searched to find the values that maximize the search surface function. Other embodiments result in faster execution.

8 Claims, 17 Drawing Sheets

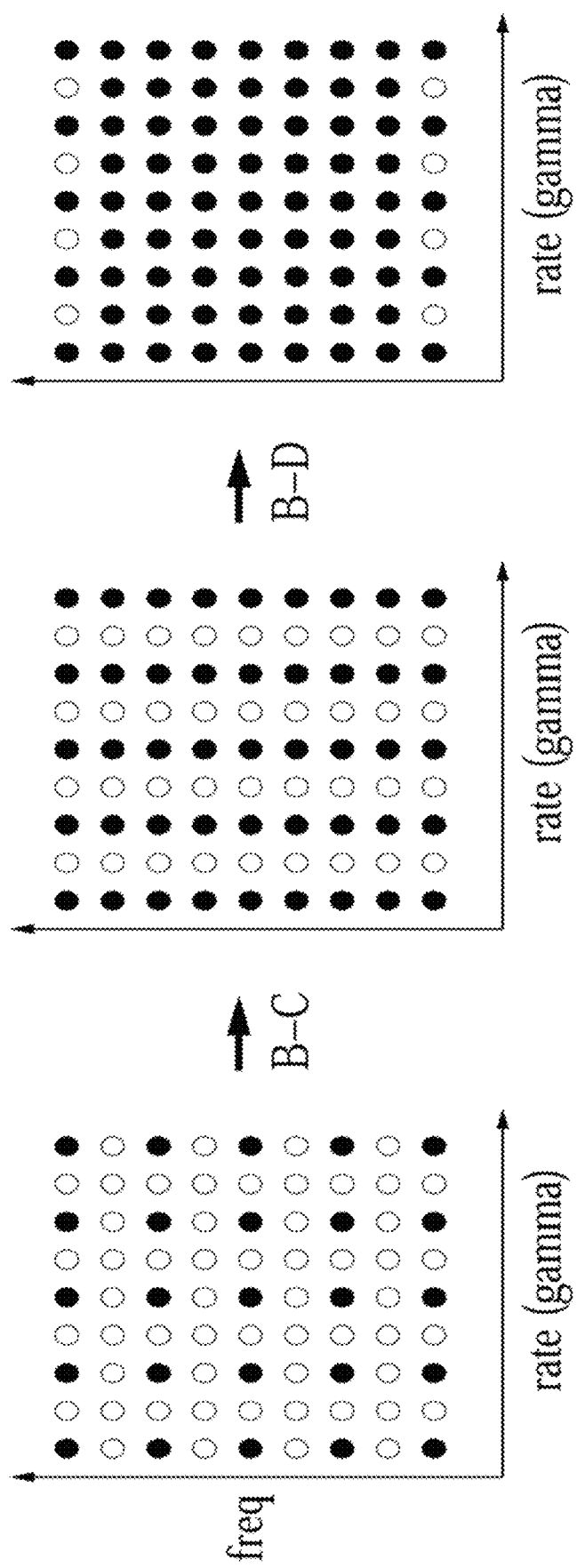

FAST METHOD TO SEARCH FOR LINEAR FREQUENCY-MODULATED SIGNALS

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF THE INVENTION

1. Field of the Invention

The invention relates to signal processing systems and methods in general and particularly to a signal processing method that employs recursive interpolation and sparse-matrix methods implementation with thresholding in order to speed up the search for the parameters of a linear frequency modulated signal.

2. Description of the Prior Art

The linear frequency modulated (FM) signal or "chirp" is used extensively in signal processing to model man-made or natural signals. When the parameters (starting frequency and slope or chirp rate) are unknown, it is necessary to search a two-dimensional parameter space. Since there are on the order $N^2$ useful pairs of starting frequencies and slopes to test, a brute-force search would require a computational load of $N^3$ for a length-N input data record. The state-of-the-art method using the Fast Fourier Transform ("FFT") achieves a computational load of $N^2 \log N$.

Consider the linear frequency-modulated (FM) chirp signal defined by $$s_i(a,\gamma,f,\theta) = a \exp\{jt_i^2\gamma + j2\pi t_i f + j\theta\}, 1 \le i \le N, \quad (1)$$

where N and i are integers, a is an amplitude, $\theta$ is a phase angle parameter, the slope parameter $\gamma$ exists in the range $$N\pi/2 \le \gamma \le N\pi/2$$

the frequency parameter f exists in the range $$0 \le f \le N/2,$$

and the time samples are $$t_i = (i-1)/N.$$

When $\gamma, f$ are unknown, the maximum likelihood (ML) solution searches over the two dimensional space $(\gamma, f)$. Let $\gamma$ be selected from the set $$\_\Gamma = \left|\left(-\frac{N}{2}\right)\pi, \left(-\frac{N}{2}+\delta\right)\pi, \ldots \left(\frac{N}{2}\right)\pi\right|$$

where $\delta$ is the slope search resolution parameter. If $\delta=2$, there are $N/2+1$ possible slope values. Since we have found that $\delta=2$ provides adequate coverage, we will assume from here on that $\delta=2$.

Let f be selected from the set $$F = \left|0, \frac{1}{2}, 1, \frac{3}{2}, \ldots \frac{N}{2}\right|.$$

Note that the frequency search resolution is 2 times finer than an FFT requiring that a size-2N transform be used. There are $(N+1)(N/2+1)$ bins to search for this sampling of the $(\gamma, f)$ plane. The search surface function is given by:

$$F(x_1 \ldots x_N, f, \gamma) = \sum_{i=1}^{N} x_i \exp\{-j(t_i^2\gamma + 2\pi t_i f)\}. \quad (2)$$

The brute-force calculation of the search surface $|F(x_1 \ldots x_N, f, \gamma)|$ is implemented in MATLAB®, available from The MathWorks, Inc., 3 Apple Hill Drive, Natick, Mass. 01760-2098. The MATLAB code is presented in TABLE I below and shows the elapsed time for the calculation.

TABLE I

```
%  set data size
N=256;
%  choose injected signal parameters. gam is slope, frq is
      frequency
gam=-N/8*pi; frq=N/4;
%  set search bins for slope and frequency
gams=[-N/2 : 2 : N/2]*pi;
frqs=[0: 1/2 : N/2]';
%  create signal and noise
SIG_LEVEL=1.0;
t=[0:N-1]'/N;
s=exp(1i*t. 2*gam+1i*2*pi*t*frq);
x=SIG_LEVEL * sqrt(128/N) * real(s)+randn(N,1);
%  brute-force search
%  fill array with zeros
F=zeros(N+1,N/2+1);
tic
%  loop from 1 to N/2 +1 where j is the loop variable for
      slope
    for j=1:N/2+1,
%  loop from 1 to N+1 where i is the loop variable for
      frequency
      for i=1:N+1,
%  calculate periodic portion of the search surface
          e=exp(1i*t. 2*gams(j)+1i*2*pi*t*frqs(i));
%  multiply periodic portion by coefficients
          F(i,j) = e'*x;
      end;
    end;
toc
elapsed_time = 5.9481
imagesc(gams,frqs,abs(F)); axis xy
xlabel ('slope (gamma)');
ylabel ('frequency (f)');
```

FIG. 1 is a diagram that illustrates a typical search surface. Since correlating the input data at each test frequency and slope requires N operations, the process is of order $N(N+1)(N/2+1) \cong N^3/2$. This is prohibitive if N is large.

The maximum likelihood search is typically done using the fast Fourier transform (FFT) to greatly speed up the search over f. For a given choice of $\gamma$, we form the de-chirped signal $$z_i = x_i \exp\{-jt_i^2\gamma\},$$

where $x_i$ are input data samples containing signal $s_i$ plus additive independent Gaussian noise. Because the de-chirped signal needs to be zero-padded to length 2N, the total computation load for the FFT is 2 Nlog$_2$(2N), which must be computed N/2+1 times for a total computational load of (N/2+1)2 Nlog$_2$(2N).

A reduction is possible when taking advantage of the zero-padded FFT, bringing the computational load to (N/2+1) 2Nlog$_2$(N). The MATLAB code is presented in TABLE II below.

TABLE II

```
E=zeros(N,N/2+1);
for j=1:N/2+1,
    E(:,j)=exp(-1i*t.^2*gams(j));
end;
tic
X=repmat(x,1,N/2+1);
F=fft(X.*E,2*N);
toc
elapsed_time = 0.0115
imagesc(gams,frqs,abs(F)); axis xy
xlabel ('slope (gamma)');
ylabel ('frequency (f)');
```

The MATLAB code given in TABLE II produces exactly the same surface as the brute-force method. Our observed speedup factor of about 550 is mainly due to the vectorization that we used in the FFT approach as opposed to the inefficient looping that we used in the brute-force algorithm. Despite the improvements, the order N$^2$ log(N) computational load still too high for many applications.

Known in the prior art is Gruber et al., U.S. Pat. No. 5,249,150, which is said to disclose a circuit and method for iteratively estimating Fourier coefficients of one or more Fourier components of a measuring signal that utilizes a filter to determine the Fourier coefficients for sampling time k−1. The coefficients are utilized to obtain an estimate of the measuring signal at sampling time k. A subtractor circuit subtracts an actual sample of the measuring signal at sampling time k from the estimate of the measuring signal at sampling time k to obtain a difference signal. The difference signal is inputted back into the filter to determine an estimate of the Fourier coefficients at sampling time k.

Known in the prior art is Fukuda et al., U.S. Pat. No. 5,960,373, which is said to disclose a frequency analyzing method for analyzing frequency components of an original signal. The method has: a spectrum detecting step of detecting, from the original signal, energy levels of components of a predetermined number of orthogonal function waves which have waveforms each having same start position and end position in a predetermined time window and in which the number of occurrences of periods in the predetermined time window or frequencies are different from each other; and an orthogonal function wave changing step of changing at least one of the start position and the end position within the predetermined time window after completion of the spectrum detecting step, wherein the spectrum detecting step and the orthogonal function wave changing step are alternately repeated. According to Fukuda, it is possible to provide frequency analyzing method and apparatus which can contribute to estimate each correct fundamental frequency from a complex distorted wave signal such as a musical signal or the like by a relatively simple construction and to provide complex sound separating method and apparatus using the frequency analyzing method or apparatus.

Also known in the prior art is Scheppach, U.S. Pat. No. 6,484,112, which is said to disclose a method for estimating the frequency of a time signal by means of a discrete Fourier transformation (DFT) and interpolation between support points of the DFT spectrum. According to the method, the Hamming window is used in a known manner for filtering and the interpolation is carried out according to the mathematically calculated solution. The method makes use of the fact that a function of the third degree which can serve as a correction distance has a clear solution within the definition range of the amount ratio between a secondary maximum and a primary maximum of the DFT spectrum. The correction distance is calculated according to this solution on the basis of the ratio of the secondary maximum and the primary maximum.

Also known in the prior art is Nelson, U.S. Pat. No. 6,577,968, which is said to disclose a method of estimating the frequency of a signal by first receiving a signal, forming a row vector, segmenting the row vector; converting the row vector to a first matrix, multiplying the first matrix by a weight, and performing a Fourier transform on the result of the last step. These same steps are repeated on a delayed version of the signal. The next steps are calculating a complex conjugate for each result of the last step, forming a cross-spectrum matrix, selecting a magnitude in the cross-spectrum matrix that is above a threshold; and setting an angular frequency of the signal to either the phase of the selected magnitude, the phase of the mean of the complex numbers in the row in which appears the selected magnitude, or the selected magnitude. The frequency of the signal is then set to the estimated angular frequency divided by the product of 2π and the signal delay period. Additional rows are processed if need be.

Also known in the prior art is Hillerstrom, U.S. Pat. No. 6,598,005, which is said to disclose a method for measuring a frequency f=ω/2π of a sinusoidal signal V(t)=A sin(ωt+α) with an essentially constant amplitude A. Measured values are registered in the form of the instantaneous level of the signal V(t), V(t−h) and V(t−2 h) at three points of time separated by a predetermined measuring period h, which corresponds to a measurement frequency f$_s$=1/h. Then the measured values are applied to a calculating device, which recursively estimates the quantity y(t) given by: y(t)=y(t−h)+ ηe(t)s(V(t−h)), where e(t)=[V(t)+V(T−2 h)]/2−y(t−h) and ηs(V(t−h))V(t−h)≧0. The choice of η and s(.) controls the convergence speed of y(t)→cos(ωh) and the noise sensitivity of the measurement system. Finally the frequency is calculated or looked up in a table based on the expression f(t)=(f$_s$/ 2π)arc cos y(t).

Also known in the prior art is Michel, U.S. Pat. No. 7,076,380, which is said to disclose a method for analyzing the frequency in real-time of a non-stationary signal and corresponding analysis circuit. According to the invention, the signal is sampled, digitized, and broken up into sub-bands. In each sub-band, the signal is modeled by an auto-regressive filter the transfer function of which is of the form 1/A(z). By an adaptive method that is recursive in time and in order, all the polynomials A(z) that have a degree between 1 and a maximum value are calculated. The order of the model is estimated and the polynomial that has this order is retained. The roots of this polynomial are calculated and the components are monitored. The frequency and the amplitude of the sinusoidal components of the signal are thus obtained. Applications include aeronautics, electromagnetic, mechanics, seismic prospecting, zoology, and others.

Also known in the prior art is Shim et al., U.S. Pat. No. 7,103,491, which is said to disclose a method of estimating parameters of time series data using a Fourier transform. The parameter estimation method can directly estimate modes and parameters, indicating the characteristics of a dynamic system, on the basis of the Fourier transform of the time series data. The method is advantageous in that it can estimate parameters of the system through a single Fourier transform without repeatedly calculating a Fourier transform, thus shortening the time required to estimate the parameters.

Also known in the prior art is Rao, U.S. Pat. No. 7,124,042, which is said to disclose a system and method for estimating parameters of multiple tones in an input signal. The method includes receiving samples of the input signal, generating a frequency transform (FT) of the samples, identifying multiple amplitude peaks in the FT corresponding to the tones, and determining parameter estimates characterizing each of the multiple tones based on the peaks. For each tone, the effects of the other tones are removed from the FT of the peak of the tone using the parameter estimates of the other tones to generate modified FT data for the tone. Single tone estimation is applied to the modified FT data to generating refined parameter estimates of the tone, which is used to update the parameter estimates of the tone. After refining the estimates for each tone, the entire process may be repeated one or more times using successive refined estimates to generate final estimates for the parameters.

A literature search revealed a number of algorithms related to this problem that include the following. There are algorithms that attain fast performance by searching only over 1-dimensional space of γ (see J. Cao, N. Zhang, and L. Song, "A fast algorithm for the chirp rate estimation," in *Proceedings of the 4th IEEE International Symposium on Electronic Design, Test and Applications (DELTA* 2008), pp. 45-48, January 2008; P. M. Djuric and S. M. Kay, "Parameter estimation of chirp signals," *IEEE Trans on Acoustics, Speech and Signal Processing*, vol. 38, pp. 2118-2126, December 1990; and W. Li, M. Dan, X. Wang, D. Li, and G. Wang, "Fast estimation method and performance analysis of frequency modulation rate via rat," in *Proceedings of the* 2008 *International Conference on Information and Automation (ICIA)*, (Zhangjiajie, China), pp. 144-147, June 2008). These algorithms confuse signals with different starting frequency and similar slope and typically require a higher signal-to-noise ratio (SNR) to work properly.

There are algorithms that integrate in the time-frequency transform (TF) plane (see S. Barbarossa, "Analysis of multicomponent lfm signals by a combined wigner-hough transform," *IEEE Trans on Signal Processing*, vol. 43, pp. 1511-1515, June 1995; S. Krishnan and R. Rangayyan, "Detection of chirp and other components in the time-frequency plane using the hough and radon transforms," in *Proceedings of the* 1997 *IEEE Pacific Rim Conference on Communications, Computers and Signal Processing*, vol. 1, (Victoria, BC, Canada), pp. 138-141, August 1997; and J. Wood and D. Barry, "Radon transformation of time-frequency distributions for analysis of multicomponent signals," *IEEE Trans on Signal Processing*, vol. 42, pp. 3166-3177, November 1994). The computation of the TF distribution adds significant processing load. In addition, because of cross-terms, these methods can have difficulties with multi-component signals.

There are algorithms that are based on the fractional Fourier transform (FrFT) See H. M. Ozaktas, O. Ankan, M. A. Kutay, and G. Bozdaki, "Digital computation of the fractional fourier transform," *IEEE TRANSACTIONS ON SIGNAL PROCESSING*, vol. 44, September 1996. No significant processing improvement can be obtained because of the necessity of calculating a FrFT for each assumed slope.

A set of similar algorithms called various names such as the discrete chirp Fourier transform (DCFT) (See C. A. Aceros-Moreno and D. Rodriguez, "Fast discrete chirp fourier transforms for radar signal detection systems using cluster computer implementations," in *Proceedings of the* 48*th Midwest Symposium on Circuits and Systems*, vol. 2, pp. 1047-1050, August 2005), discrete quadratic phase transform (DQPT) (See M. Z. Ikram, K. Abed-Meraim, and Y. Hua, "Fast discrete quadratic phase transform for estimating the parameters of chirp signals," *Digital Signal Processing*, vol. 7, pp. 127-135, April 1997), and polynomial time-frequency transform (PTFT) (See G. Bi and Y. Wei, "Split-radix algorithms for arbitrary order of polynomial time frequency transforms," *IEEE Trans on Signal Processing*, vol. 55, pp. 134-141, January 2007; and Y. Ju and G. Bi, "Generalized fast algorithms for the polynomial time-frequency transform," *IEEE Trans on Signal Processing*, vol. 55, pp. 4907-4915, October 2007). The DCFT is defined as:

$$X[k, l] = \sum_{i=0}^{N-1} x_i W_N^{li^2 + ki},$$

where $W_N = e^{j2\pi/N}$, l and k are integers in the range 0 to N−1. Since useful chirp signals use fractional values of l between −½ and ½, this transform that uses integer l is of little value for our purposes. The authors claim an impressive computational reduction, but this requires the calculation of mostly unrealistic values of slope. The DQPT and PTFT are similarly defined and have the same problems.

In short, one is left with the FFT-based algorithm described above that has $N^2 \log_2(N)$ computational load as the only realistic solution available up to now. There is a need for more efficient and less time consuming methods for analyzing linear frequency-modulated signals.

SUMMARY OF THE INVENTION

A primary objective of the present invention is to provide improved systems and methods to identify a linear frequency modulated (LFM) signal (or chirp signal) in noise.

It is also a primary objective of the present invention to produce an apparatus that can perform the identification of the parameters of the linear frequency modulated (LFM) signal in noise.

It is also an objective of the present invention to produce an apparatus that can perform the identification of the parameters of the linear frequency modulated (LFM) signal in noise with a computational time that is of the order of $N^2$, where N is an integer that represents the number of data points to be examined.

Accordingly there is provided, a computer implemented method for determining start frequency and frequency shift rate (hereinafter "slope") of a linear frequency modulated signal. Windowed signal data is collected and used for formulating a search surface function. The function is divided into parts. Part values are calculated at a reduced number of points corresponding to the length of the parts. The search surface function part values are interpolated at values between frequency values. An interpolation geometry is chosen and then the function part values are interpolated at values between frequency values and slopes. Function parts are added together giving a restored search surface function. Breaking the data into parts can be formulated in a recursive fashion by always breaking into two parts, then operating on each half by again breaking into halves, and so forth. The frequency and slope values can be searched to find the values that maximize the search surface function. Other embodiments result in faster execution.

In one embodiment, the method doesn't calculate function values for which the frequency crosses 0 or N/2.

In another embodiment, the method performs the additional step of amplitude thresholding the function values to eliminate data points for which the amplitude is lower than a threshold value.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views wherein:

FIG. 5A is a diagram that shows the effect of decimation; doing "B-C" interpolation geometry on all possible pairs;

FIG. 5B is a diagram that shows the effect of doing "B-C" interpolation geometry;

FIG. 5C is a diagram showing the result of B-D interpolation on FIG. 5B;

DETAILED DESCRIPTION OF THE INVENTION

This describes an algorithm that achieves $N^2$ performance with a measured speed-up factor of more than 20 for $N \geq 512$. An approximate algorithm is also described that is nearly optimal and achieves performance with a measured speed-up factor of 40 at N=2048 at a cost of a 2 dB increase in the minimum detectable signal level.

This approach has a computational load $N^2$ rather than $N^2 \log_2(N)$ and can offer a factor of more than 20 in processing speed-up. An approximation based on thresholding is also described that can achieve even more computational reduction.

As a first step, the function F( ) is generalized and the function G( ) is defined to operate on an arbitrary time-segment of the data of length K. Let $$G(i_0, K, f, \gamma) = \sum_{i=1}^{K} x_{i_0+i} \exp\{-j t_{i_0+i}^2 \gamma - 2\pi t_{i_0+i} f\}. \quad (3)$$

In other words, $G(i_0, K, f, \gamma)$ is a transform of the windowed data of length K starting at time index $i_0$. The full length-N transform can be written $$F(x_1 \ldots x_n, f, \gamma) = G(1, N, f, \gamma). \quad (4)$$

By dividing the data into two parts, we can write:

$$G(1, N, f, \gamma) = G(1, N/2, f, \gamma) + G(1 + N/2, N/2, f, \gamma). \quad (5)$$

The algorithm G( ) becomes recursive (in the sense of a function calling itself) if we write in general $$G(i, K, f, \gamma) = G(i, K/2, f, \gamma) + G(i + K/2, K/2, f, \gamma). \quad (6)$$

We can continue the recursion (dividing into halves) until each call to function G( ) is applied to a single sample of data. Although interesting, the recursive decomposition does not significantly change computing performance. To make progress, we need to use interpolation.

Notice that in Eq. (6), the functions G(i,K/2,f,γ) and G(i+K/2,K/2,f,γ) operate on a shorter data record than G(i,K,f,γ), yet the functions must be calculated for all (N+1)(N/2+1) choices of (f,γ). Clearly the search surface is oversampled.

Figure 1:
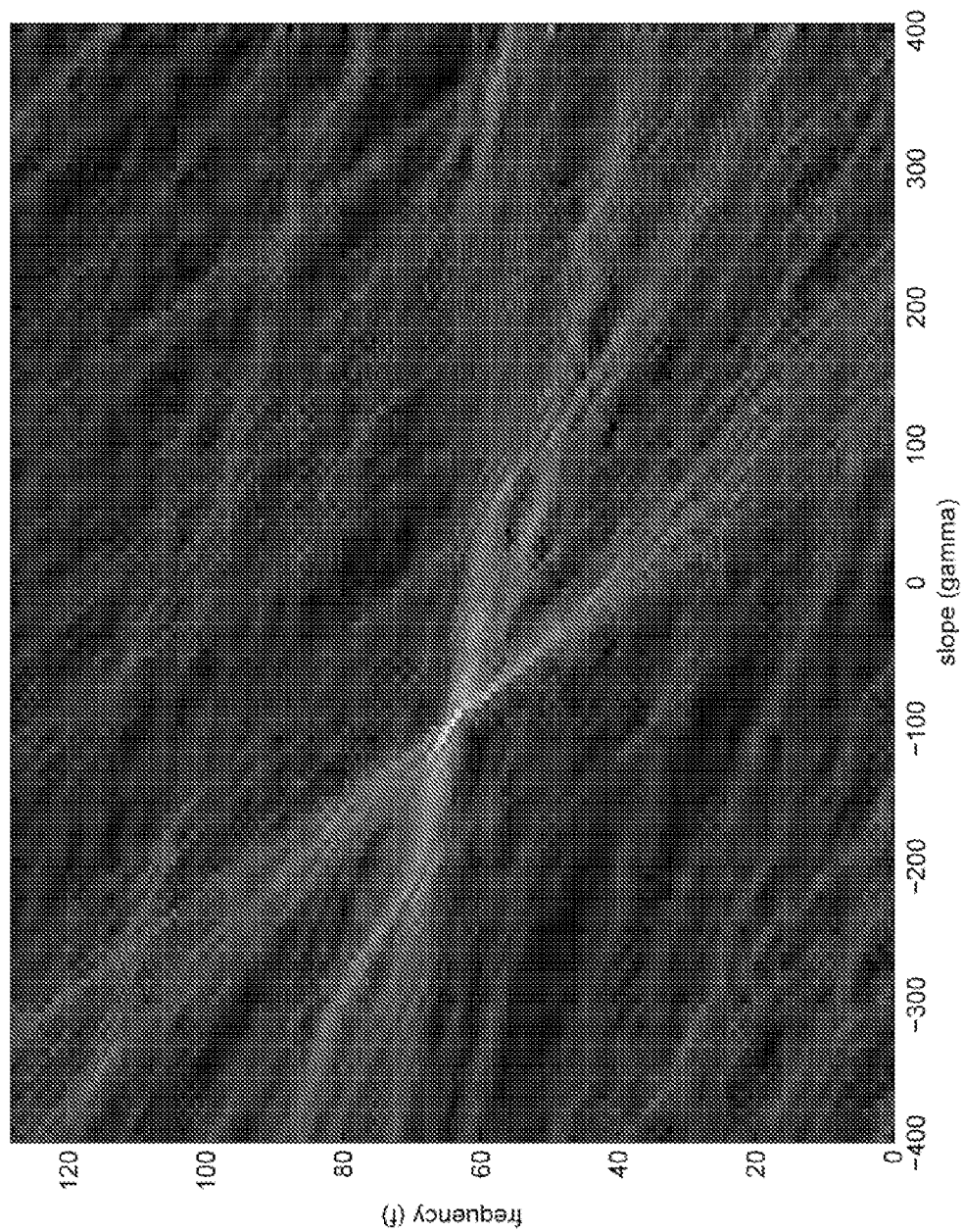
FIG. 1 is a diagram that illustrates a typical search surface.
Figure 2A:
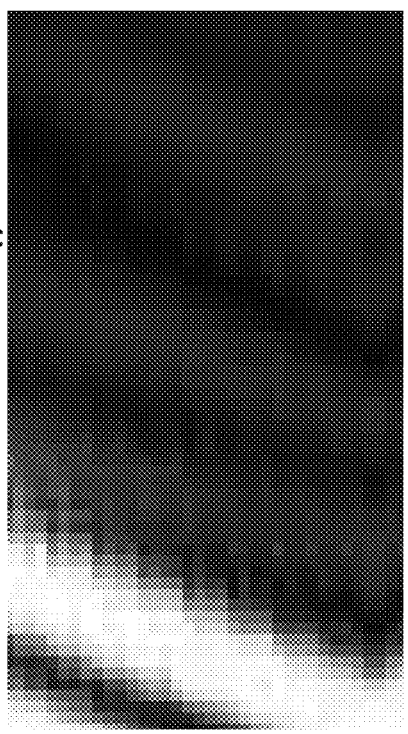
FIG. 2A is a first diagram showing the decomposition results for N=64 where G(1, 16, f, γ)
Figure 2B:
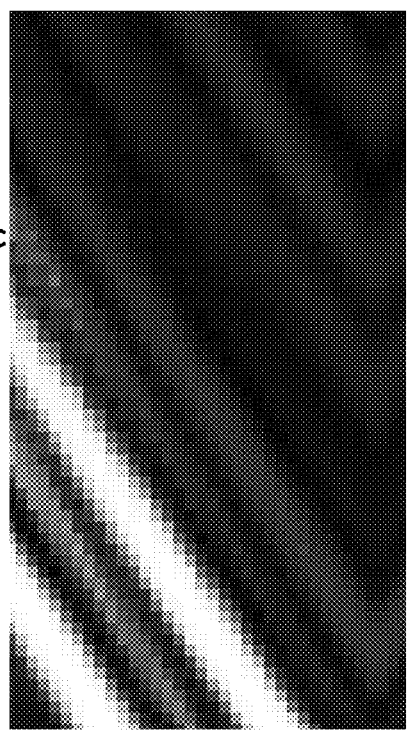
FIG. 2B is a second diagram showing the decomposition results for N=64 where G(17, 16, f, γ)
Figure 2C:
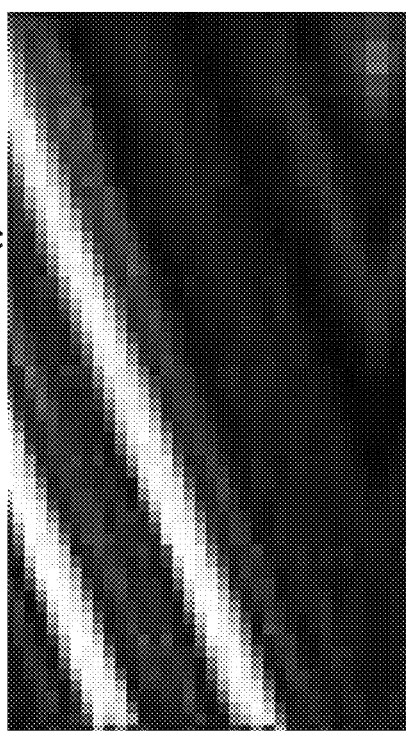
FIG. 2C is a third diagram showing the decomposition results for N=64 where G(33, 16, f, γ)
Figure 2D:
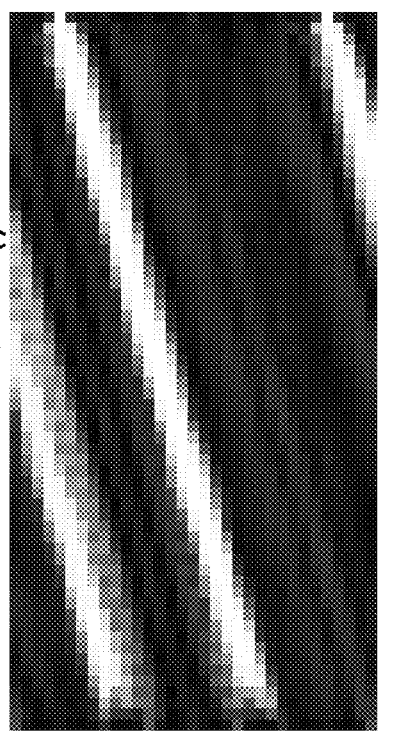
FIG. 2D is a fourth diagram showing the decomposition results for N=64 where G(49, 16, f, γ)
Figure 2E:
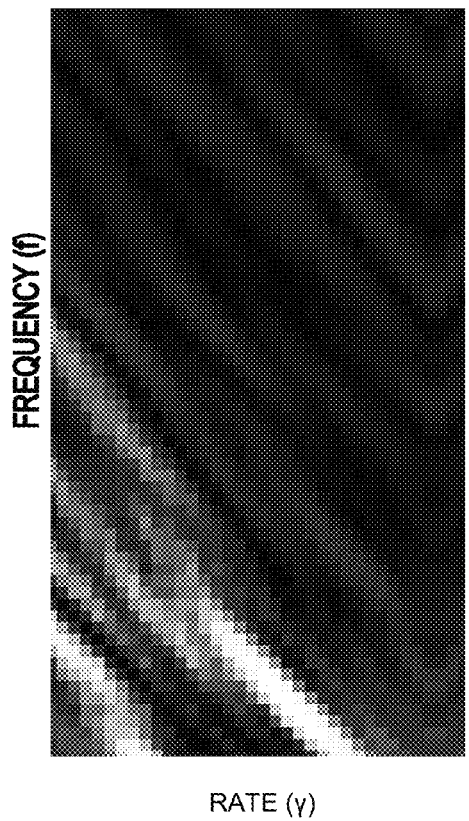
FIG. 2E is a diagram showing the summation of the diagrams of FIG. 2A and FIG. 2B giving G(1, 32, f, γ)
Figure 2F:
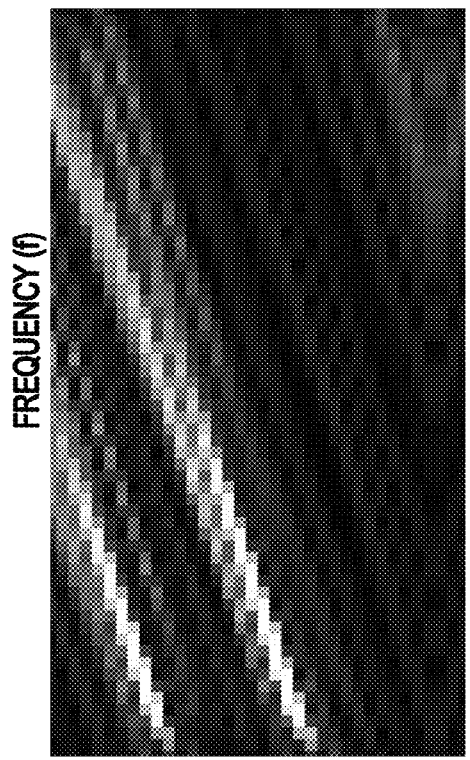
FIG. 2F is a diagram showing the summation of the diagrams of FIG. 2C and FIG. 2D giving G(33, 32, f, γ)
Figure 3:
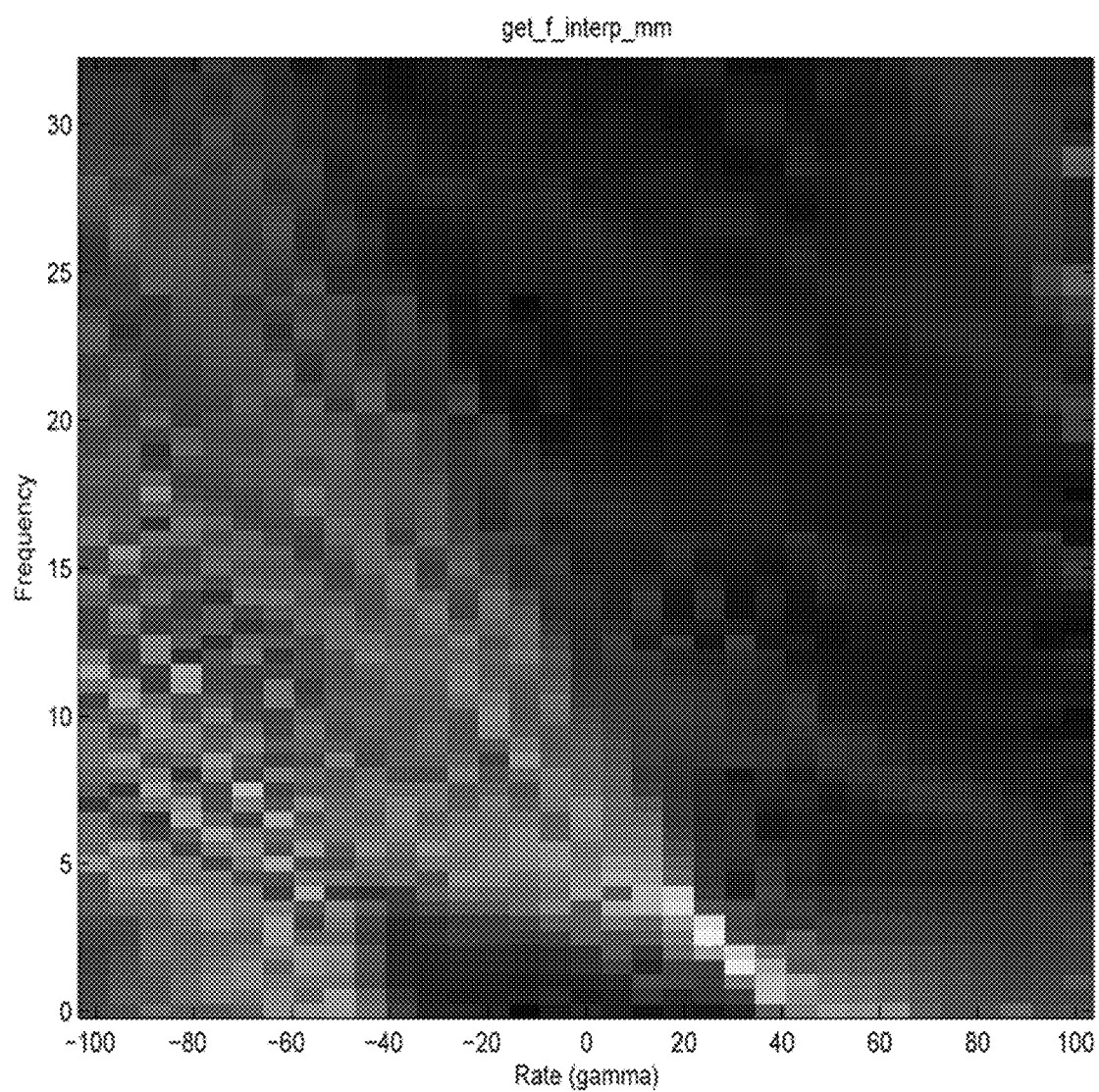
FIG. 3 is a diagram showing the decomposition results for N=64 by summing the diagrams of FIG. 2E and FIG. 2F giving the magnitude of G(1, 64, f, γ)

FIGS. 2A-2F and FIG. 3 illustrate this idea for N=64. In the sequence of FIGS. 2A-2F, we see four surfaces for K=16 (FIGS. 2A and 2B, and FIGS. 2C and 2D) summed to create two K=32 surfaces (FIGS. 2E and 2F), which are then summed to create the final K=64 surface (FIG. 3.) In these operations and in further operations in this disclosure, the complex functions are summed but only the magnitudes are displayed in the figures.

As the data segment size gets smaller, the smoothness of the image increases. Conversely, as the surfaces of smaller data windows are added together, the result is always finer in detail. We take advantage of this observation by calculating fewer transform points (that is for fewer (f,γ) bins) as K becomes smaller. So, as we divide the data into two parts, we decimate the requested values of both f and γ by a factor of two. However, since we still need the higher resolution surfaces to sum, we need to interpolate the surfaces before the summation. We will find that the interpolation requires less computation than calculating the surfaces at high resolution.

Figure 4B:
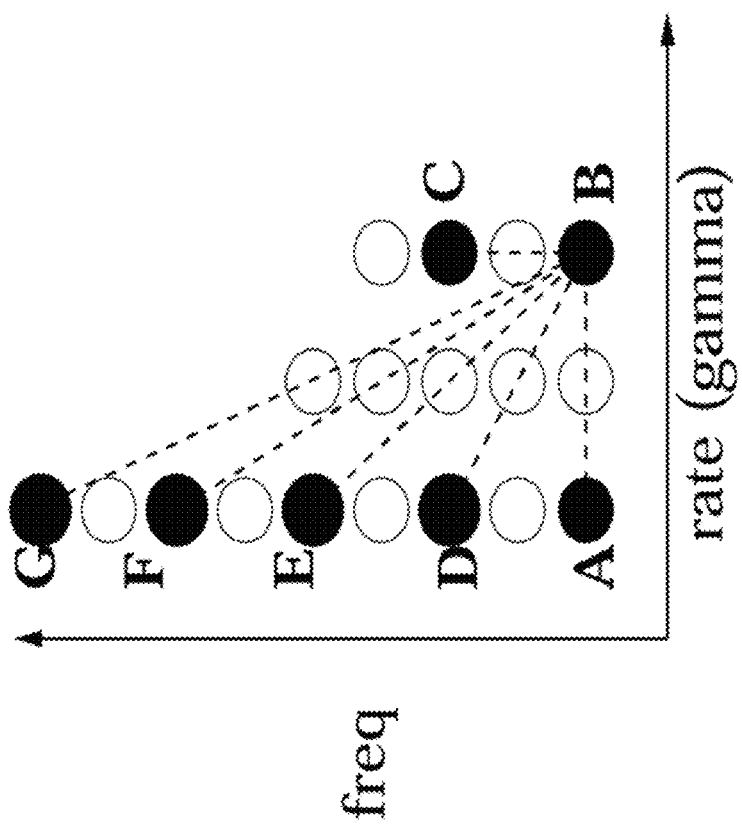
FIG. 4B is a diagram showing six interpolation geometries that can be used to interpolate the necessary points: B-A, B-C, B-D, B-E, B-F, and B-G.
Figure 4A:
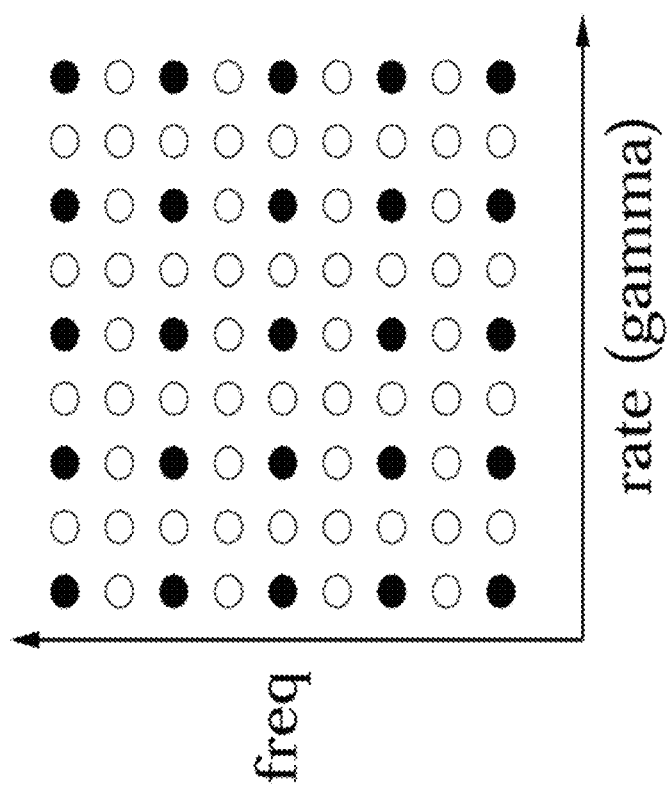
FIG. 4A is a diagram showing the interpolation scheme.

Turning to FIG. 4A, the black dots represent the points (f,γ) for which we have already calculated G(i,K/2,f,γ). The empty circles are to be estimated by interpolation. On the right side of the figure, we see a blow-up of a typical cluster of points. In FIG. 4B, we have identified six interpolation geometries. In each geometry, we interpolate to determine the value of a point directly in between two existing points. The geometries are denoted by "B-A", "B-D", "B-E", "B-F", "B-G", and "B-C".

Our approach is to first perform "B-C" interpolation (vertical—in frequency domain only) everywhere possible which doubles the number of frequency points, then use one of the other geometries to fill in the missing values of γ.

Once "B-C" interpolation geometry has been applied to all possible pairs, it is then possible to use "B-A", "B-D", "B-E", "B-F", or "B-G" interpolation geometries to fill in the remaining circles in the figure. This is illustrated in FIG. 5A, FIG. 5B and FIG. 5C in which we use B-C followed by B-D.

Now referring to FIG. 2, on the top row, you see the search surfaces from the data windows representing the first through fourth quarters of the data. The correlation structure that is apparent in the data runs diagonally from upper left to bottom right. The angle, however, depends on the time slice.

In FIG. 4B, we see five interpolation geometries to fill in the missing γ value. The best geometry to use is the one that matches the main axis of the correlation. One of these geometries is the best for each time slice. As we will see next, it is a simple matter of determining the correlation coefficient between point "B" and "A", "D", "E", "F", and "G", under the assumption of white noise input, to see which correlation has the highest magnitude. In each situation, we can use the best interpolation geometry.

To carry out the interpolation, we appeal to statistical analysis of the complex search values assuming the input is independent Gaussian noise. Let z be a point that is to be estimated from points $y_1$ and $y_2$. Let the interpolation be accomplished by the linear operation $$\hat{z} = a_1 y_1 + a_2 y_2.$$

The principle of orthogonality requires that $E\{\bar{y}_1(\hat{z}-z)\}=0$ and $E\{\bar{y}_2(\hat{z}-z)\}=0$. Expanding, $$E\{\bar{y}_1 z\} = E\{\bar{y}_1 \hat{z}\} \qquad (7)$$
$$= E\{\bar{y}_1(a_1 y_1 + a_2 y_2)\}$$
$$= a_1 E\{|y_1|^2\} + a_2 E\{\bar{y}_1 y_2\}$$

Likewise, $E\{\bar{y}_2 z\} = a_1 E\{\bar{y}_2 y_1\} + a_2 E\{|y_2|^2\} \qquad (8)$ Arranging into matrix form, $$\begin{bmatrix} E\{\bar{y}_1 z\} \\ E\{\bar{y}_2 z\} \end{bmatrix} = \begin{bmatrix} E\{|y_1|^2\} & E\{\bar{y}_1 y_2\} \\ E\{\bar{y}_2 y_1\} & E\{|y_2|^2\} \end{bmatrix} \begin{bmatrix} a_1 \\ a_2 \end{bmatrix}, \qquad (9)$$

which is linearly solvable for $a_1, a_2$. Note that by symmetry arguments, $a_1 = \bar{a}_2$. Consider an arbitrary pair of transform values $z = F(f_z, \gamma_z)$ and $y = F(f_y, \gamma_y)$. We now calculate the correlation between y and z. From Eqn. (2), $$E\{\bar{y}z\} = E\left\{\left[\sum_{i=1}^{N} \tilde{x}_i \exp\{-jt_i^2 \gamma_y - t_i f_y\}\right]\left[\sum_{k=1}^{N} x_k \exp\{-jt_k^2 \gamma_z - t_k f_z\}\right]\right\} \qquad (10)$$

$$= \sum_{i=1}^{N}\sum_{k=1}^{N} E\{\bar{x}_i x_k\} \exp\{jt_i^2 \gamma_y + t_i f_y\} \exp\{-jt_k^2 \gamma_z - t_k f_z\}$$

If we assume $$E\{\bar{x}_i x_k\} = \delta[i-k],$$

$$E\{\bar{y}z\} = \sum_{i=1}^{N} \exp\{-jt_i^2(\gamma_z - \gamma_y) - t_i(f_z - f_y)\} \qquad (11)$$

Figure 6A:
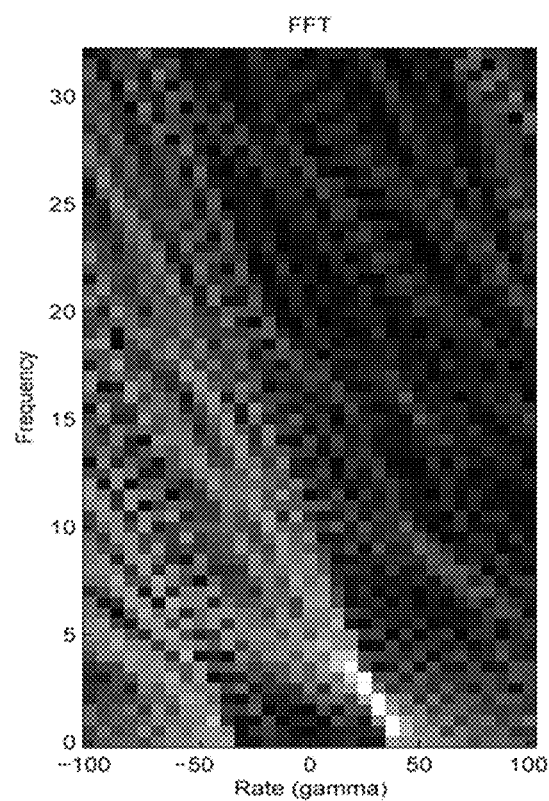
FIG. 6A shows the results of the prior art FFT method.
Figure 6B:
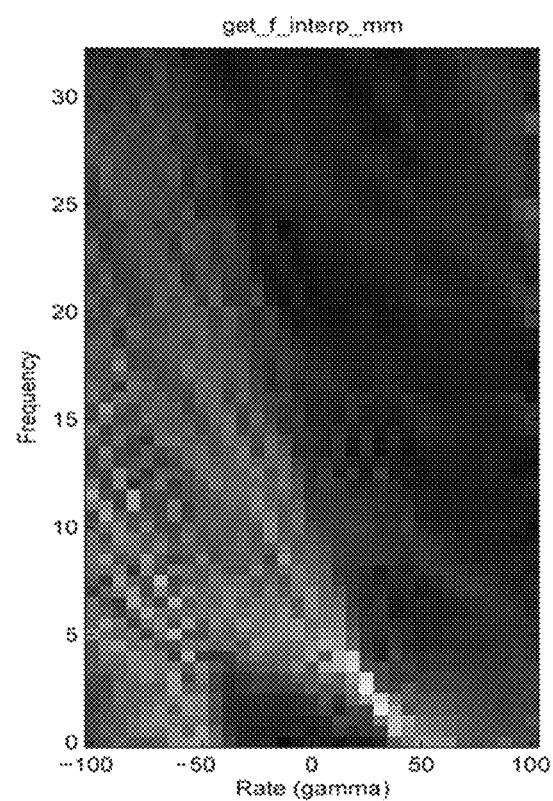
FIG. 6B shows the results of the interpolation method.

Thus, the correlation structure depends only upon frequency difference and slope difference. This means that the same interpolation can be used anywhere in the f,γ grid. Note, however, that it depends also on the time values $t_i$, so varies depending on which data window is being transformed. The interpolation coefficients can be pre-computed. FIG. 6A shows the results of the prior art FFT method, and FIG. 6B shows the results of the interpolation method. While the difference is not clear visually, the two surfaces produce different numerical values; however, there is a large difference in computational speed.

Let $l_K$ be the number of complex operations needed to compute the surface for G(i,K,f,γ) at the required (decimated) (K+1) frequency bins times (K/2+1)γ bins. Since we divide the data into two K/2 windows, we need $2l_{K/2}$ operations to calculate the initial (K/2+1) frequency bins times (K/4+1)γ bins on each half. Then, the number of missing bins to interpolate on each half-surface equals $$\left(\frac{K}{2}\right)\left(\frac{K}{4}+1\right)$$

vertical (B-C) interpolations plus $$(K+1)\left(\frac{K}{4}\right)$$

diagonal interpolations, totaling $$\frac{3K}{4}\left(\frac{K}{2}+1\right)$$

interpolations. (As a check, note that $$\frac{3K}{4}\left(\frac{K}{2}+1\right) + \left(\frac{K}{2}+1\right)\left(\frac{K}{4}+1\right) = \left(\frac{K}{2}+1\right)(K+1)$$

the total number of bins.) Each interpolation requires two complex multiplies and a complex addition (3 operations). We then need to add the two half-surfaces to obtain the final surface ((K/2+1)(K+1) complex additions). In total, we have $$\_l_k = 2\left\{l_{K/2} + 3\left[\frac{3K}{4}\left(\frac{K}{2}+1\right)\right]\right\} + \left(\frac{K}{2}+1\right)(K+1).$$

If we use the approximation $$l_K \approx 2.5K^2 + 2l_{K/2},$$

and expand, we have $$l_N = 2.5N^2 + 2l_{N/2}$$

$$\_l_N = 2.5N^2 + 2\left[2.5\frac{N^2}{4} + 2l_{N/4}\right]$$

$$\_l_N = 2.5N^2\left(1+\frac{1}{2}\right) + 4l_{N/4}.$$

We can continue the expression indefinitely as $$l_N = 2.5N^2(1+\tfrac{1}{2}+\tfrac{1}{4}+\tfrac{1}{8}\ldots).$$

Since the series $1+\frac{1}{2}+\frac{1}{4}+\frac{1}{8}\ldots$ converges to 2, we have $l_N=5 N^2$.

Additional wasted effort can be eliminated by the following approaches.

Figure 7:
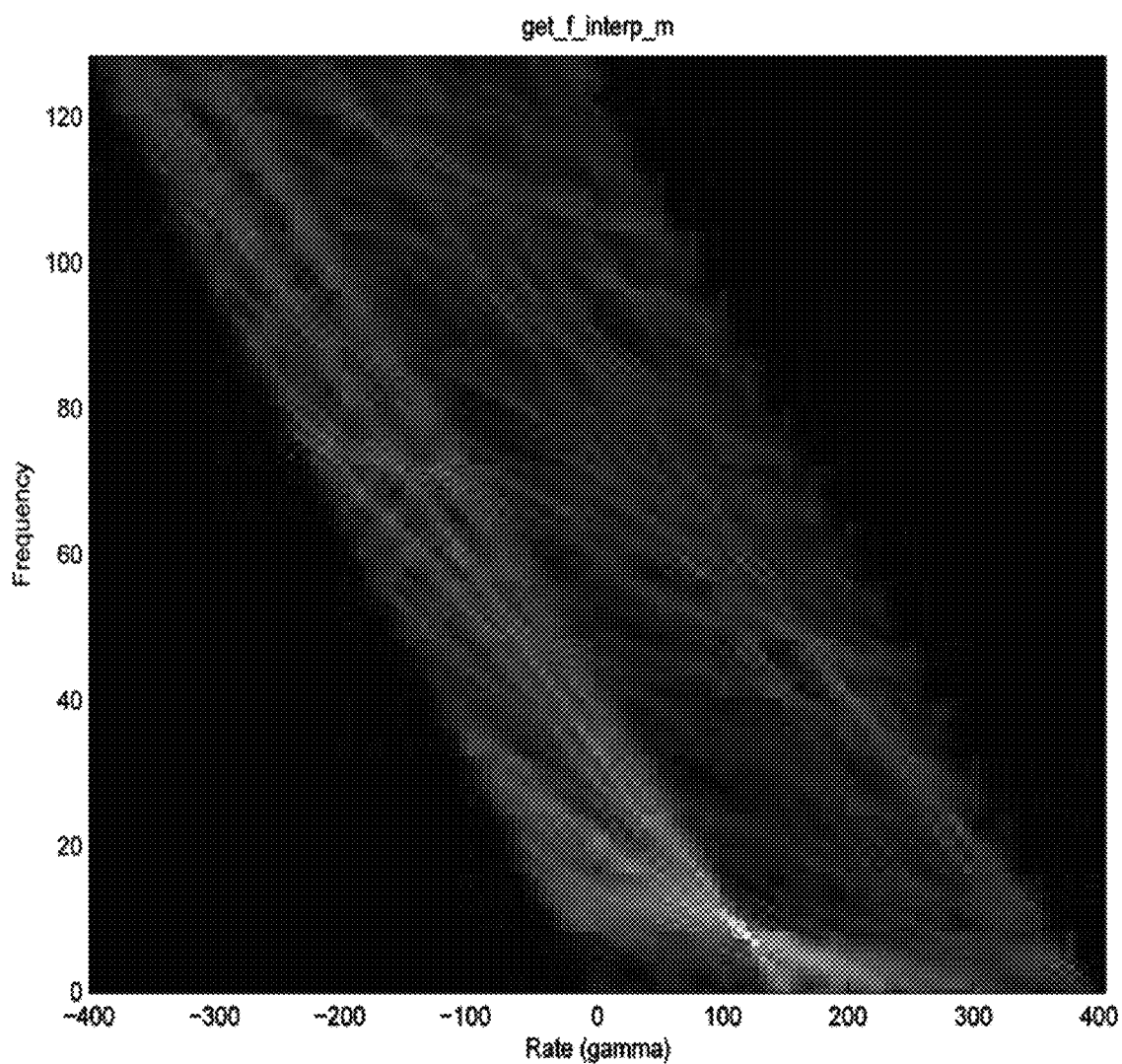
FIG. 7 is a diagram that shows the search surface for N=256 showing the elimination of unnecessary (f,γ) points as black triangular regions.

We can eliminate (f,γ) pairs for which the frequency crosses 0 or N/2 (i.e. the Nyquist frequency). The frequencies that cross are limited to triangular regions appearing as black in FIG. 7. Elimination of these points results in a factor of 2 savings.

We can apply code optimization. Processor extensions such as Streaming SIMD Extensions (SSE) which are available on Pentium 3 and above can be used. This can result in a theoretical factor of 4 improvement for single-precision floating point computations, however a factor of 2 is more realistic.

Figure 8A:
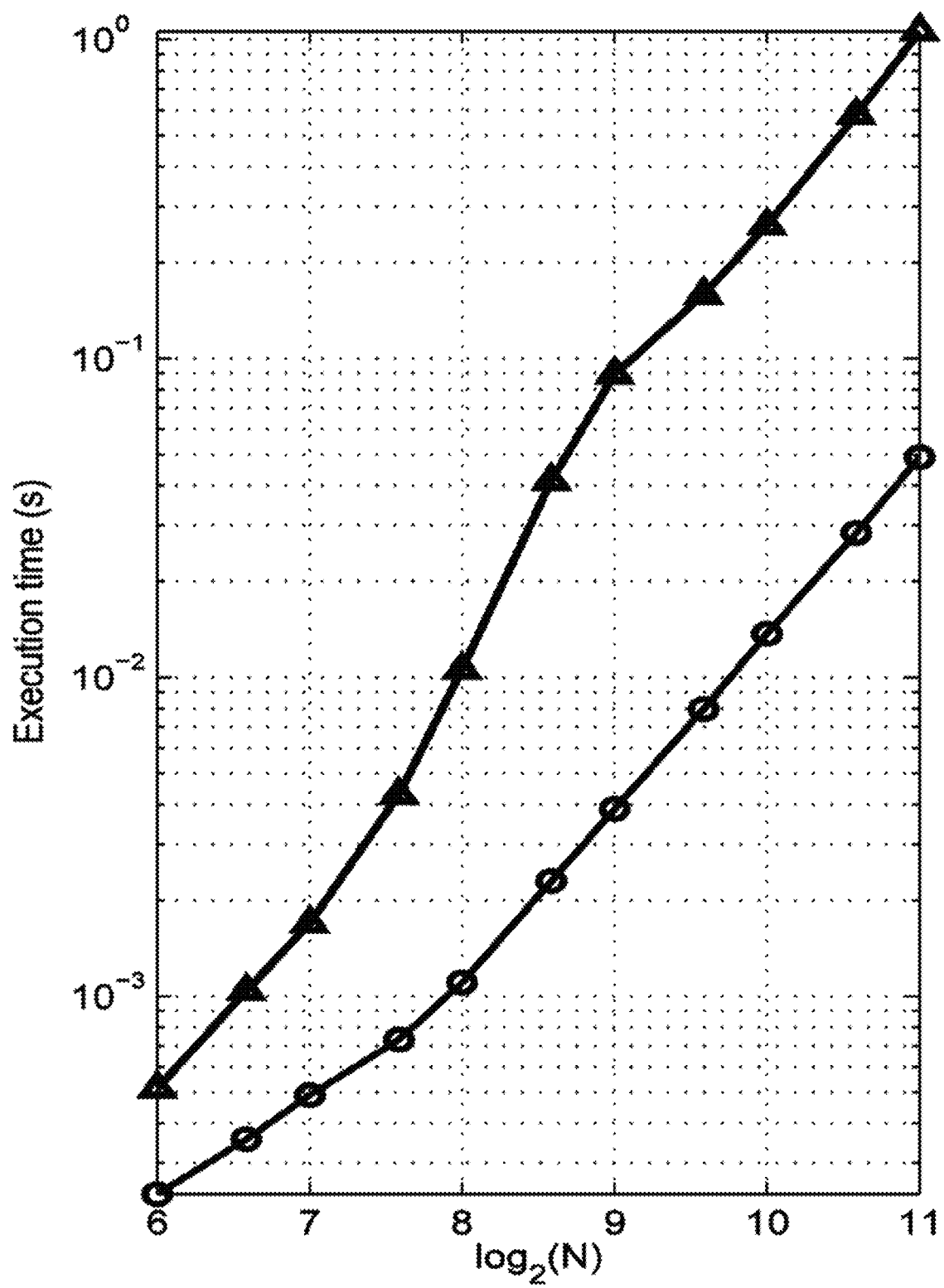
FIG. 8A is a diagram that shows the execution time of various method of calculating the search surface.
Figure 8B:
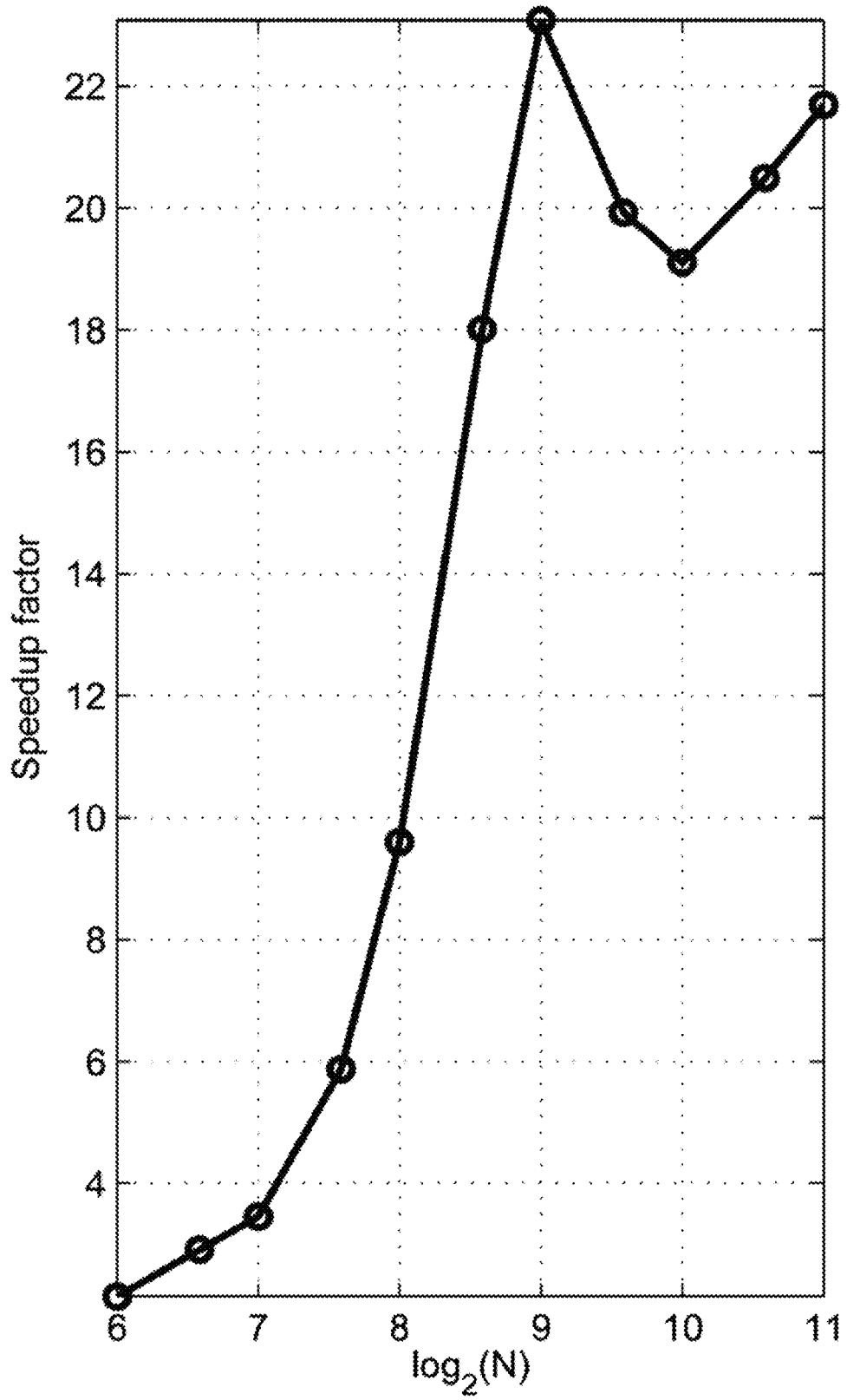
FIG. 8B is a diagram that shows the speedup factor.
Figure 9A:
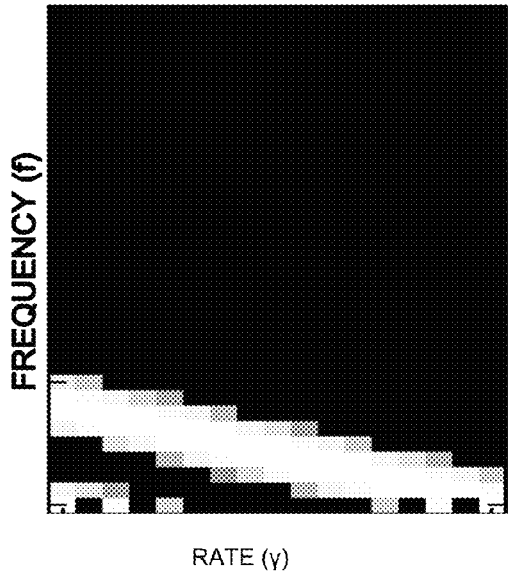
FIG. 9A is a first diagram showing the thresholded decomposition results for N=64 where G(1, 16, f, γ)
Figure 9B:
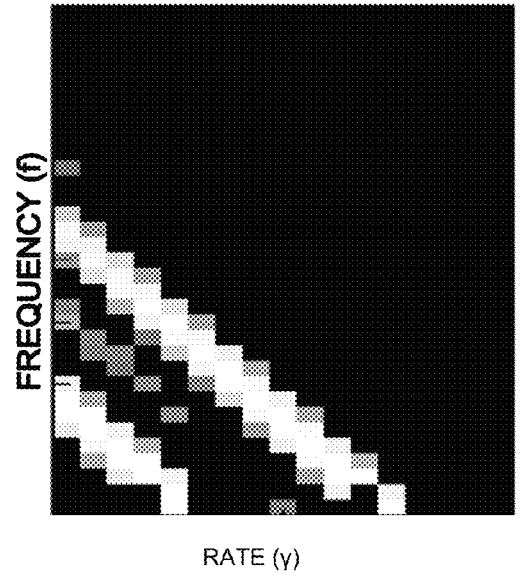
FIG. 9B is a second diagram showing the thresholded decomposition results for N=64 where G(17, 16, f, γ)
Figure 9C:
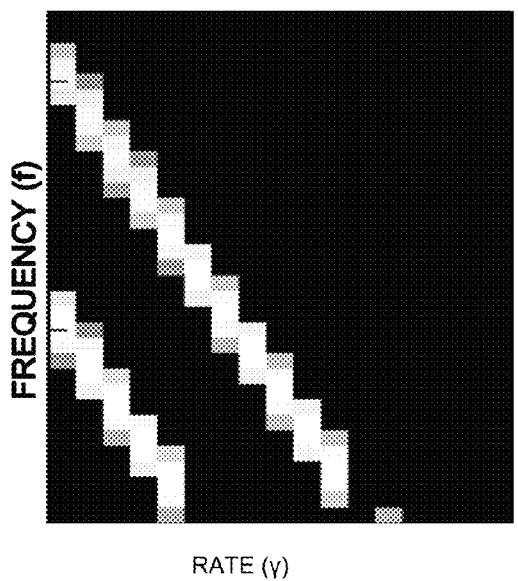
FIG. 9C is a third diagram showing the thresholded decomposition results for N=64 where G(33, 16, f, γ)
Figure 9D:
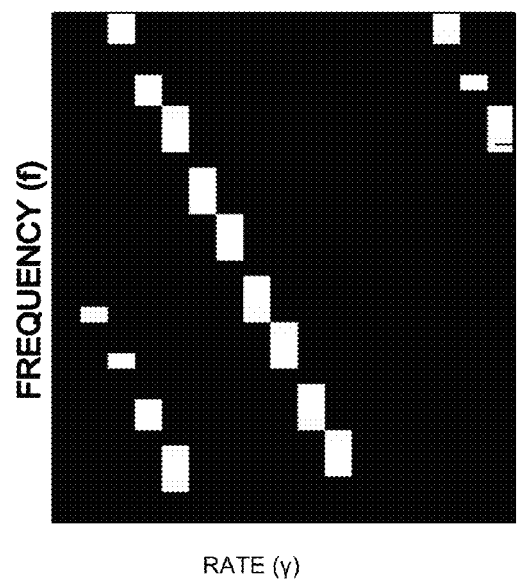
FIG. 9D is a fourth diagram showing the thresholded decomposition results for N=64 where G(49, 16, f, γ)
Figure 9E:
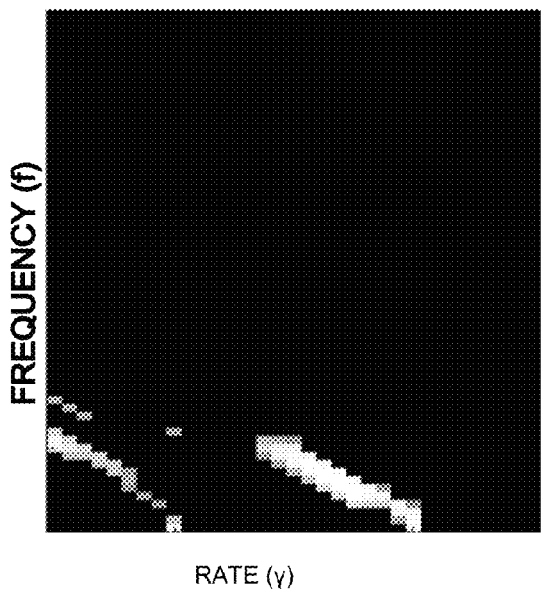
FIG. 9E is a diagram showing the summation of the diagrams of FIG. 9A and FIG. 9B giving G(1, 32, f, γ)
Figure 9F:
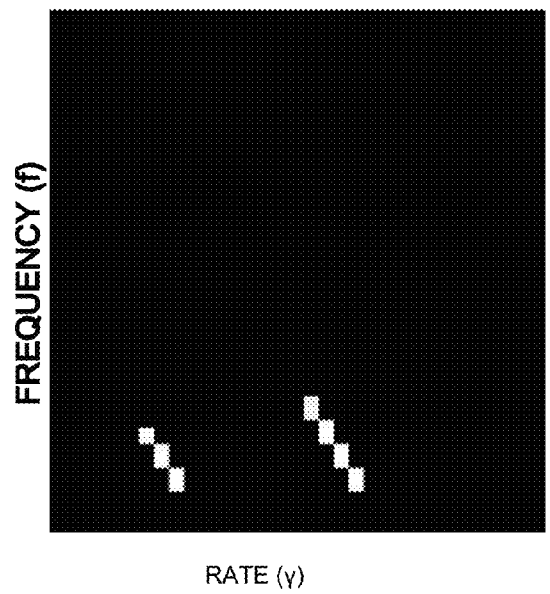
FIG. 9F is a diagram showing the summation of the diagrams of FIG. 9C and FIG. 9D giving G(33, 32, f, γ)

FIG. 8A gives a diagram showing execution times for the FFT method (triangles) and the recursive interpolation method (circles) as a function of $\log_2(N)$, using an Intel Pentium 4 processor operating at 3 GHz. Execution times include the time to compute the complex surface only, not the time needed to search for the largest amplitude value. FIG. 8B gives the speedup factor for using the recursive interpolation method. This diagram verifies the $N^2$ behavior in operation. A speedup factor of 20 was achieved.

Figure 10:
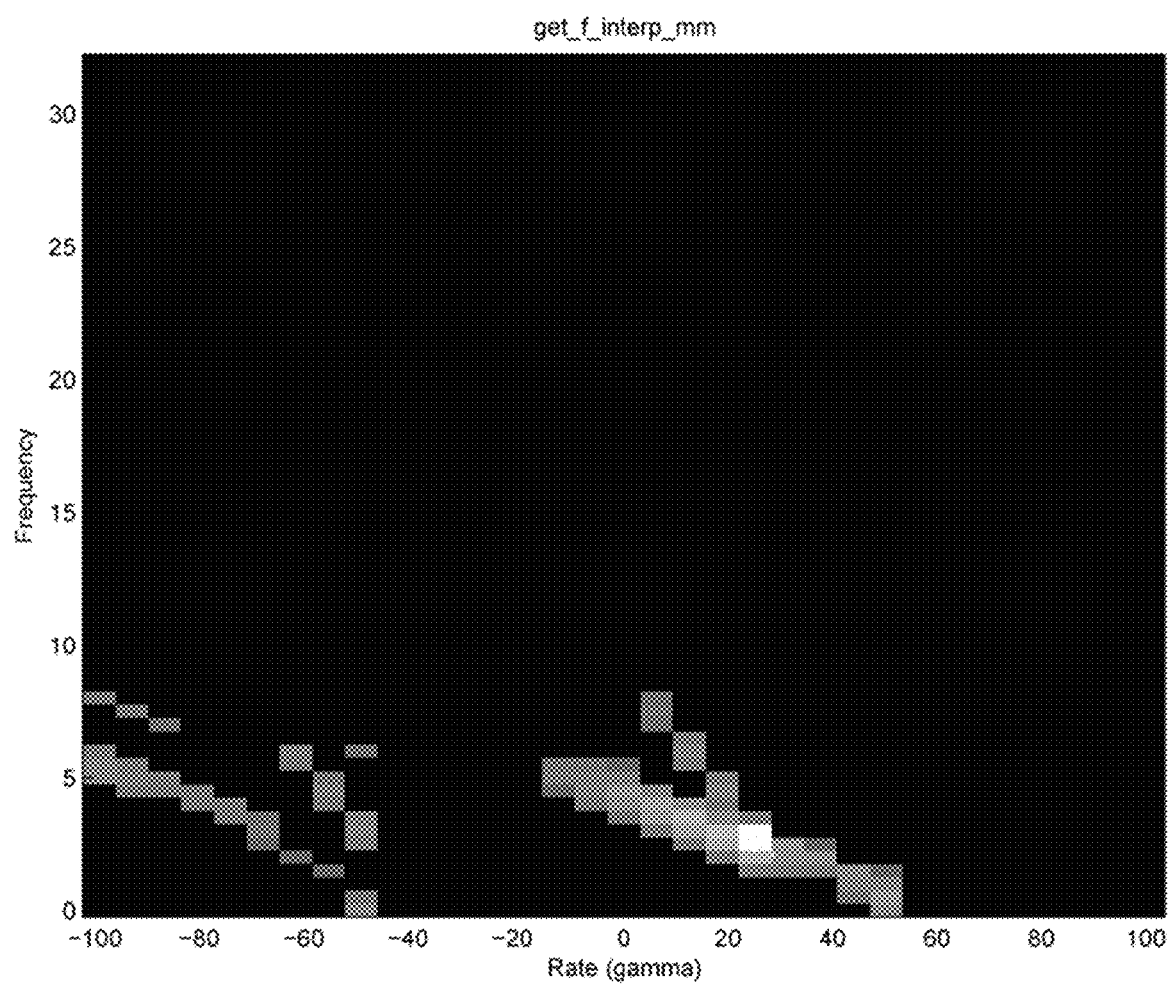
FIG. 10 is a diagram that shows the thresholded surface corresponding to FIG. 3.

An additional significant improvement can be obtained by thresholding the amplitude surfaces |G(i,K,f,γ)|. Algorithm speedup can be achieved because first, interpolation calculations need only be done on the threshold exceedences, and second, the costly final search for largest value is avoided. Refer to FIG. 9 and FIG. 10 in which we have applied a threshold to FIG. 2 and FIG. 3 before summation of the windowed halves. Thresholding allows the complex surface data to be stored efficiently in a sparse matrix. Interpolation and matrix summations can be accomplished using sparse matrix techniques. In order to prevent loss of important maxima in the search surface, the threshold must be lowered as K becomes smaller. In theory, if we are trying to detect a certain signal level $A^2=|F(x_1,x_2 \ldots x_N,f,\gamma)|^2$, the threshold must be divided by 4 at each recursion level. The factor of four accounts for a factor of 2 for the reduction of the processing gain at the lower value of K and another factor of 2 to account for the scaling (the mean value of $|F(\ )|^2$ is proportional to N with independent Gaussian noise input). At some point in the recursion, there is no more advantage to thresholding as the threshold becomes too low to be useful.

Figure 11A:
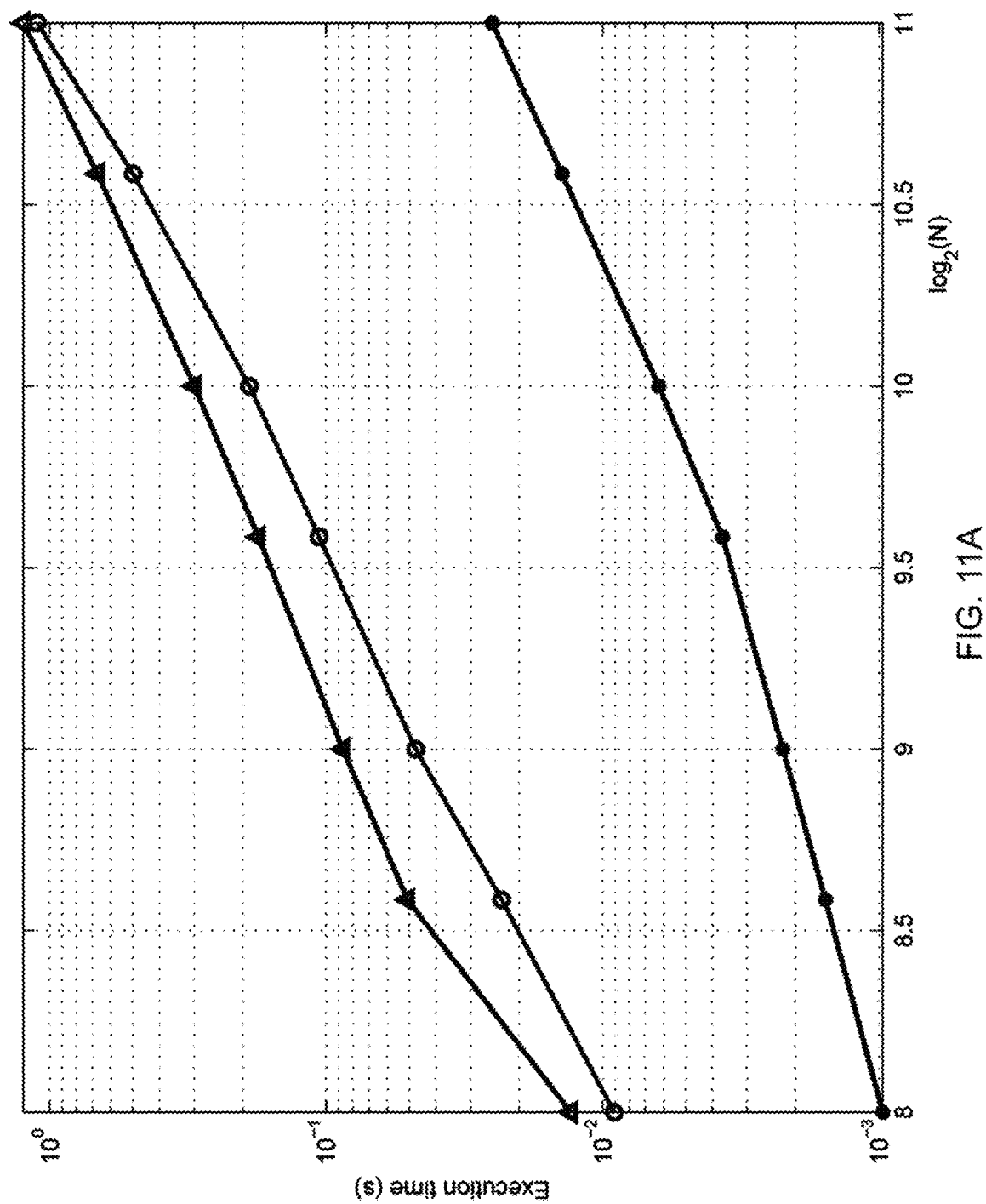
FIG. 11A is a diagram that shows the execution time of various methods of calculating parameters.
Figure 11B:
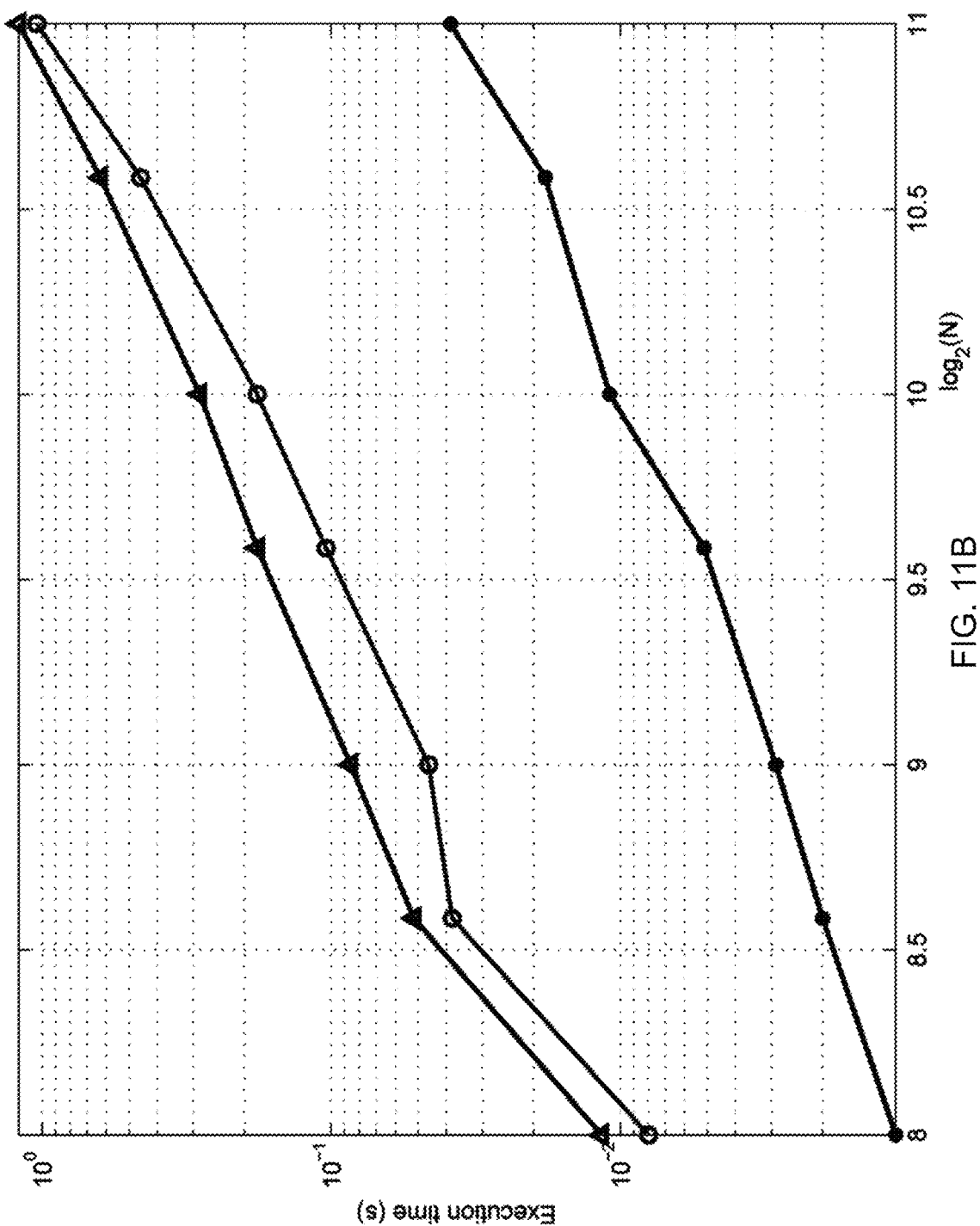
FIG. 11B is a diagram similar to FIG. 11A obtained but using a low threshold for the interpolated, thresholded method.

A comparison of execution times for various methods of calculating the search surface is given in FIG. 11A and FIG. 11B. FIG. 11A shows the execution time of the FFT method (triangles) recursive interpolation (open circles) and thresholded method with a high threshold using sparse matrix methods (closed circles) as a function of $\log_2(N)$. These performances were derived using an Intel Pentium 4 processor operating at 3 GHz. Execution times include the time needed to search the amplitude surface for the largest element. FIG. 11B is a diagram similar to FIG. 11A obtained using a low threshold. The execution times for FFT and interpolation methods are slower than those shown in FIG. 8, and the difference between the FFT and interpolation methods is also much less dramatic. This is because we have now included the time to search the surface for the largest amplitude element. The performance improvement for the interpolation method is dramatic. Thresholding was used only for K=N/4 and above. For N=2048, the speedup ratio approaches 40 at the higher threshold and about 30 at the lower threshold setting.

Figure 12:
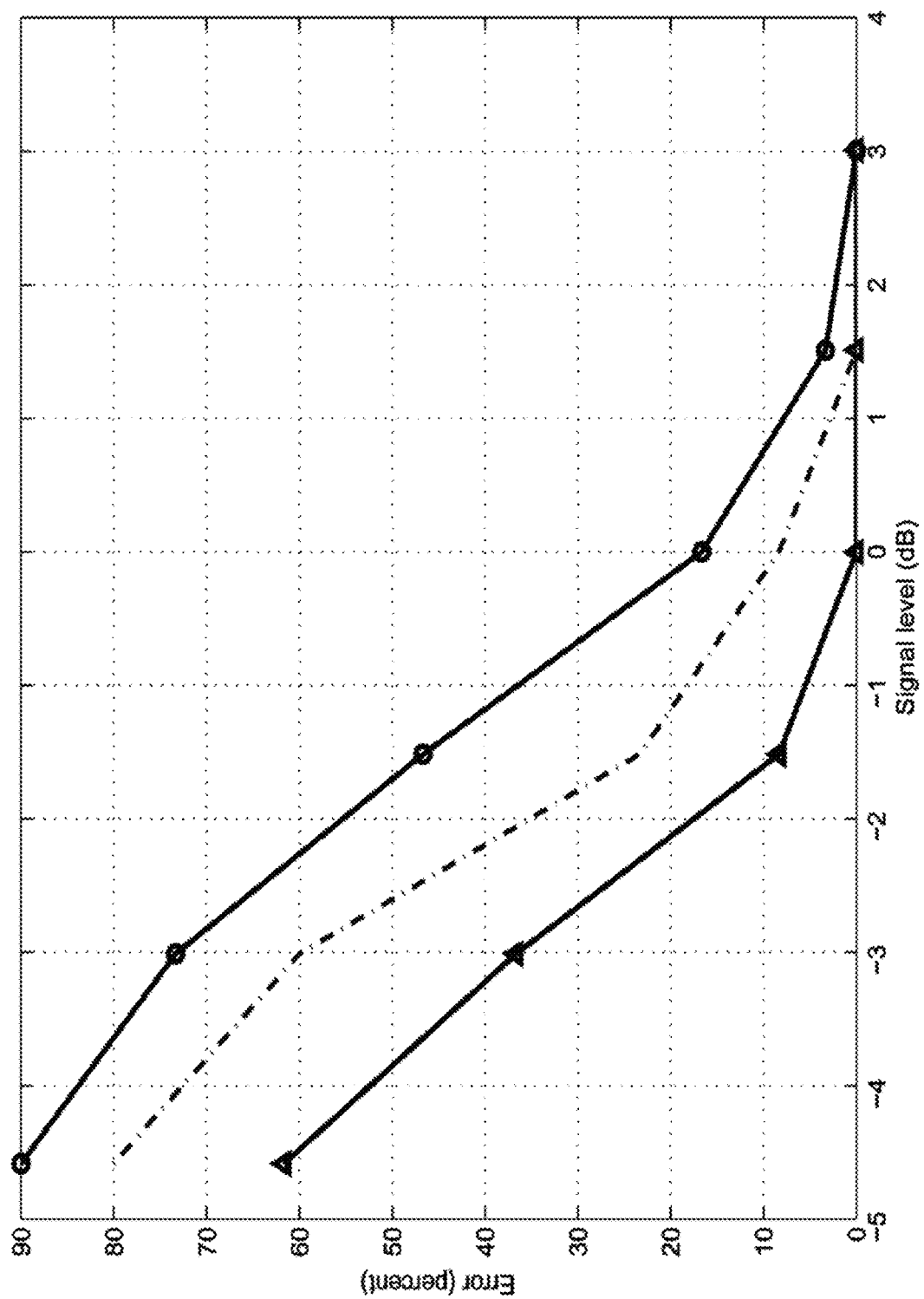
FIG. 12 is a diagram that shows the error percentage as a function of signal level.

FIG. 12 shows the low SNR performance of the FFT and interpolation/threshold method. The signal level in dB was calculated as 20*log10(SIG_LEVEL) where SIG_LEVEL is defined in the MATLAB code section used to create a test signal. An error was declared if the maximum surface amplitude occurred at a distance from the true point. Errors were determined manually. Errors that were within the main lobe and in a diagonal direction from the true maximum were not counted. The use of the threshold method results in a 2 dB increase in minimum detectable level at the higher threshold setting and 1 dB at the lower threshold setting.

We have developed a fast algorithm for maximum likelihood search of the parameters of a linear frequency modulated (LFM) signal in noise. The algorithm is order $N^2$ complexity, improving upon the state of the art which is order $N^2$ logN complexity. The algorithm was shown to have a speedup factor of over 20 in comparison to an efficient implementation of the prior art algorithm. However, the time needed to then search for the largest value in the resulting two-dimensional surface is sufficiently large that it accounts for about half of the overall computational load. To remedy this problem, we demonstrated a sparse-matrix implementation that used thresholding to increase the overall speedup factor to about 30.

Figure 13:
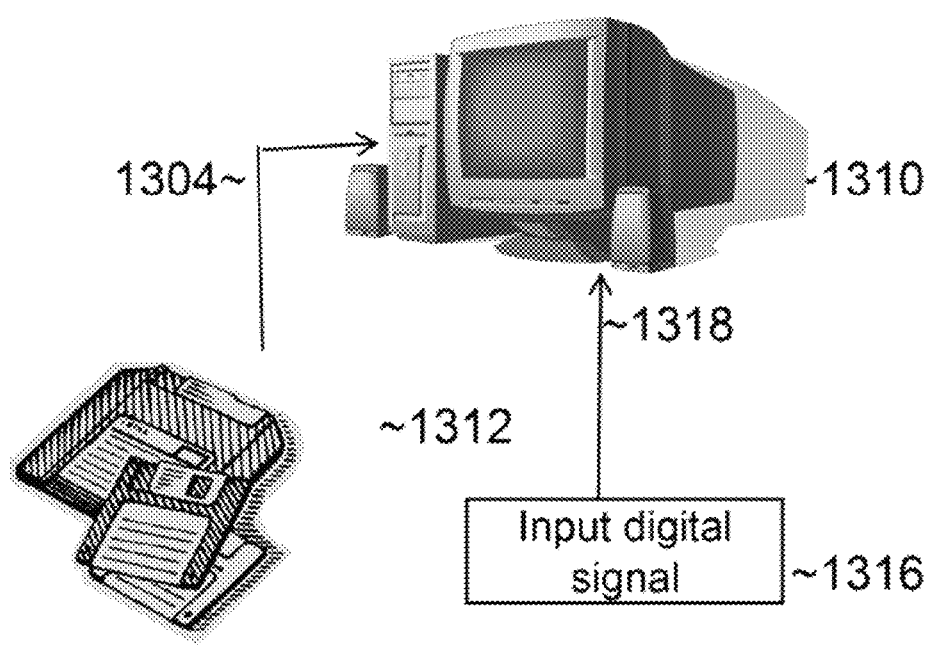
FIG. 13 is a diagram showing a high level implementation of an embodiment.

FIG. 13 is a schematic diagram that illustrates a hardware system that can be provided to implement the disclosed invention. As illustrated in FIG. 13, the system includes a general purpose programmable computer 1310 programmed with computer instructions in machine readable format (e.g., software) on a machine readable medium such as a floppy disk 1312 (e.g., software). Arrow 1314 indicates that the floppy disk 1312 can be inserted into a disk drive of the computer. The computer 1310 is configured to receive the required digital data, for example from sensing hardware 1316 (e.g., one or more hydrophones). Arrow 1318 indicates the flow of data from the sensing hardware 1316 to the computer 1310. The computer 1310 when running the software is configured to perform the requisite calculations, and to provide a computed result in any convenient form, such as a graphical display or a numerical table, and can record the result (for example on a floppy 1312), store the result for later use, transmit the result to a user or to another computational system, and/or display the result to a user (for example on the display of the computer 1310).

Figure 14:
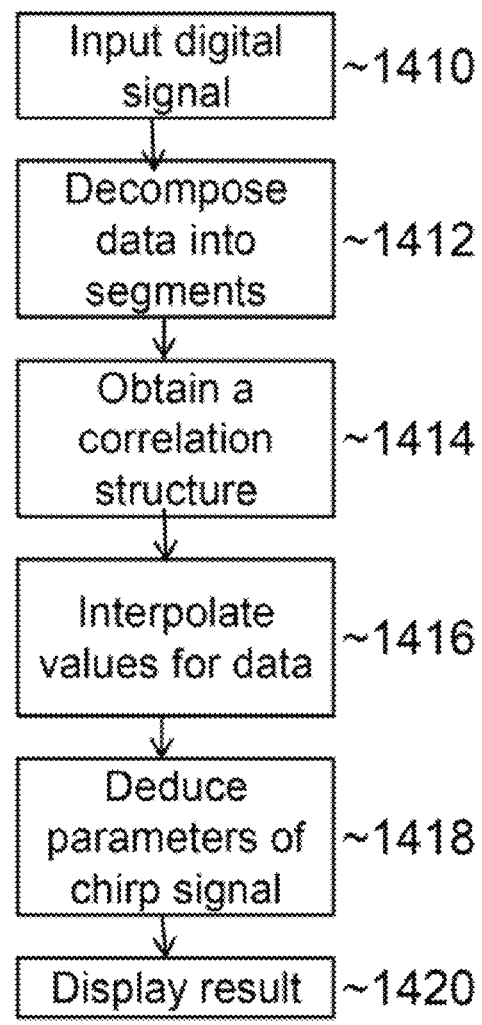
FIG. 14 is a flowchart of an embodiment.

FIG. 14 is a schematic flow diagram of the process of line shape estimation. The process involves the step of collecting digital data from a source, as expressed in box 1410. The process involves the step of decomposing the data into segments, as expressed in box 1412. The process involves the step of obtaining a correlation structure, as expressed in box 1414. The process involves the step of interpolating values for the, as expressed in box 1416. The process involves the step of deducing parameters of a chirp signal, as expressed in box 1418. The process ends with the step of recording, storing and/or displaying the result, e.g., parameters of a chirp signal if present, as expressed in box 1420.

The determined chirp signal parameters can then be cross referenced with a database of known chirp signal parameters. For example, known biological signals such as bird calls or whale songs could be compressed to their most fundamental frequencies and stored in a database. The extracted chirp signal parameters can be compared against the known biological signals to find the known biological signal that most nearly matches the extracted chirp signal parameter. The known signal can then be identified to a user as a near match.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for determining frequency and slope of a linear frequency modulated signal for implementation on a computer comprising the steps of:
    collecting windowed data samples concerning the signal;
    formulating a search surface function from said windowed data samples;
    dividing the search surface function into a number of parts;
    calculating the search surface function values at a selected number of frequency and slope values, said selected number of frequency and slope values being related to the number of parts;
    calculating search surface function parts for each search surface data part at the selected frequency and slope values;
    interpolating the search surface function parts at values between selected frequency values for a selected slope to obtain first interpolated values, each interpolation between selected frequency values being an interpolation geometry;
    calculating a correlation coefficient for each interpolation geometry;
    determining the best interpolation geometry for the search surface function part at slopes between selected frequencies and selected slopes as the interpolation geometry that gives the highest correlation coefficient;
    interpolating to obtain search surface function part values at frequencies and slopes between selected frequencies and slopes according to the determined best interpolation geometry to obtain second interpolated values;
    adding the search surface function parts together to give a restored search surface function, said search surface parts having first interpolated values and second interpolated values incorporated therein;
    searching through frequency and slope values of said search surface function calculated values, first interpolated values, and second interpolated values to obtain the frequency and slope values that maximize the search surface function; and
    providing the frequency and slope values that maximize the search surface function as the frequency and slope of the signal.

2. The method of claim 1 wherein frequency and slope values crossing the Nyquist rate are omitted from the calculated search surface function part.

3. The method of claim 2 wherein frequency and slope values crossing zero are omitted from the calculated search surface function part.

4. The method of claim 3 further comprising the steps of:
    determining a threshold for the search surface function part; and
    wherein said step of interpolating the search surface function part at values between frequency values is only performed when the search surface function value at the frequency value exceeds said determined threshold;
    said step of interpolating to obtain search surface function part values at frequencies and slopes between calculated frequencies and slopes is only performed when the search surface function part value at one of the calculated frequency values and slopes exceeds said determined threshold.

5. The method of claim 1 wherein the steps of dividing the search surface function values, calculating the search surface function parts, interpolating to obtain first interpolated values, calculating a correlation coefficient, determining the best interpolation geometry, and interpolating to obtain second interpolated values are performed recursively until the search surface part contains a preselected number of windowed data samples.

6. The method of claim 5 wherein frequency and slope values crossing the Nyquist rate are omitted from the calculated search surface function part.

7. The method of claim 6 wherein frequency and slope values crossing zero are omitted from the calculated search surface function part.

8. The method of claim 7 further comprising the steps of:
    determining a threshold for the search surface function part; and
    wherein said step of interpolating the search surface function part at values between frequency values is only performed when the search surface function value at the frequency value exceeds said determined threshold;
    said step of interpolating to obtain search surface function part values at frequencies and slopes between calculated frequencies and slopes is only performed when the search surface function part value at one of the calculated frequency values and slopes exceeds said determined threshold.

* * * * *